United States Patent [19]
Kelley et al.

[11] Patent Number: 5,133,005
[45] Date of Patent: Jul. 21, 1992

[54] LINE POWERED PAY TELEPHONE WITH POWER MANAGEMENT

[75] Inventors: Eugene D. Kelley; Charles E. Murphy; Piera G. Kelley, all of Sarasota; Donald J. Munn, Bradenton, all of Fla.

[73] Assignee: Elcotel, Inc., Sarasota, Fla.

[21] Appl. No.: 656,716

[22] Filed: Feb. 15, 1991

[51] Int. Cl.[5] .................... H04M 17/02; H04M 1/24
[52] U.S. Cl. .................... 379/146; 379/155
[58] Field of Search .................... 379/155, 387, 146

[56] References Cited

U.S. PATENT DOCUMENTS 4,926,458  5/1990  Reger et al. .................... 379/155 X Primary Examiner—Stafford D. Schreyer
Attorney, Agent, or Firm—Needle & Rosenberg

[57] ABSTRACT

A line powered telephoe is disclosed in which the telephone is not powered from a separate external source. The improved pay telephone is powered solely by loop current available on the telephone line from the central office. A rechargeable battery is provided to store excess loop current to enable operation of the pay telephone when not off-hook to the central office. Power consumption by components of the telephone is minimized by shutting down unnecessary functions on a selective basis to ensure that sufficient excess loop current is available to recharge the battery. In addition, an improved switched-capacitor circuit is disclosed to enable storage of electricity at a voltage potential higher than the off-hook line voltage to enable firing of standard high voltage relays for coin collection and coin return.

7 Claims, 9 Drawing Sheets

LINE POWERED PAY TELEPHONE WITH POWER MANAGEMENT

BACKGROUND OF THE INVENTION

The present invention relates to telephone systems, and particularly to a line-powered pay telephone system. More specifically, this invention relates to a coin-operated customer owned telephone (COCOT) which, by its nature, does not rely upon signalling from the central office of the telephone company to provide call rating and coin collection information to the individual telephone instrument.

Pay telephones controlled by the central office of the telephone company are well-known in the art. Early pay telephones required operator intervention to give the caller information about the cost of a call and to determine whether the necessary money was inserted into the telephone. The operator could control the initiation and continuation of the call as well as send signals to the coin telephone to collect or refund the coins in the phone. Subsequent advances in the field have involved automation of the call rating and collection by computers associated with the central office. More recently, it has become legal for individuals to own and operate pay telephones (COCOTs) not owned by the telephone companies. In order for these phones to operate, the intelligence necessary to rate calls and control the collection of coins and the actual connection of the calls has to be controlled by computer circuitry within the telephone, rather than signals from the central office.

Also, prior art pay telephones generally required an independent power source supplied at the site of the telephone. However, line-powered telephones have been designed which enable the pay telephone to obtain the necessary operating power from the telephone line itself.

An example of a prior art line-powered telephone is that described in U.S. Pat. No. 4,759,054, to Regis B. Mellon. This patent describes a line-powered pay telephone which is connected to a coin trunk. The device disclosed in U.S. Pat. No. 4,759,054 relies upon the line current to power the system in both the on-hook and off-hook conditions. Because of its limitation to line current in the on-hook condition, since such current is limited by law to five microamperes, minimal circuitry can be powered by the line. Furthermore, since this instrument is connected to a coin trunk, it generally relies upon the central telephone office to provide the current to the coin collect relay in the off-hook condition, with a battery powered option for the coin collect in those situations where the central office current is not available to operate the coin collect relay. The battery described in the Mellon patent is not used in the on-hook condition and is only used to provide a high energy pulse to the escrow relay.

It is desirable to provide a line-powered coin telephone which is capable of being used as a COCOT, and not on the coin trunk. Such telephones are not able to use the telephone company's central office to provide escrow relay signals. Therefore, it is desirable for such a system to have the capability of internally generating coin escrow relay signals as needed. Batteries are not sufficiently reliable to ensure adequate current will be available each time a coin relay signal is required.

Furthermore, it is desirable to provide a line-powered COCOT which has the capability of being self-powered in the on-hook condition so that it has sufficient power necessary to maintain computer memory as well as to power-up the telephone to make calls during alarm conditions. The power provided by the line, alone, when the telephone is in the on-hook condition is not sufficient to provide these capabilities.

SUMMARY OF THE INVENTION

The present invention relates to a line-powered pay telephone in which the telephone is not powered from any separate external source. When the phone is in the on-hook (idle) condition, the memory, the real time clock (RTC), and the wake-up circuitry are powered by a rechargeable battery. When the handset is on the hookswitch, the telephone's microprocessor and associated circuitry are powered down. In the powered down condition, the battery is able to maintain the essential circuitry for an extended period of time.

When the handset is lifted from the hookswitch, the wake-up circuitry causes the microprocessor to power-up. Once the microprocessor is powered-up, current flows from the telephone line causing an off-hook condition to appear to the Central Office (CO). The telephone can then be powered from the telephone line. During the off-hook condition to the CO (generally while the telephone call is in progress) the rechargeable battery is charged with the difference between the current from the telephone line and the current that the telephone is using.

The telephone is provided with means for maintaining a battery in the charged condition, means for minimizing power usage by shutting down any unnecessary operation of functions, and means for storing a sufficient charge for use in firing the coin relay of the pay telephone.

Therefore, it is an object of the present invention to provide a pay telephone which relies for operation solely on the power which may be legally utilized from the telephone lines when the phone is in the off-hook condition by minimizing the power usage when the telephone is on the on-hook condition and by storing excess available power during the off-hook condition in a rechargeable battery.

It is another object of the present invention to provide a pay telephone which charges a battery in the off-hook condition, for providing power in the on-hook condition, by charging the battery with the excess permissible current while selectively causing the average current used by the telephone during the off-hook condition to be sufficiently below the permissible current such that the battery may be maintained in a charged condition.

It is yet another object of the present invention to provide a pay telephone whereby electronic circuits are collectively powered down by the microprocessor during the off-hook condition such that sufficient excess average current is available for charging a battery in the phone.

It is still another object of the present invention to provide a pay telephone in which a charge may be stored from the phone line sufficient to operate the coin collect/return relay, even though the necessary charge to operate the relay may be twice the charge potential of the phone line in an off-hook condition.

DESCRIPTION OF THE PREFERRED EMBODIMENT

Figure 1:
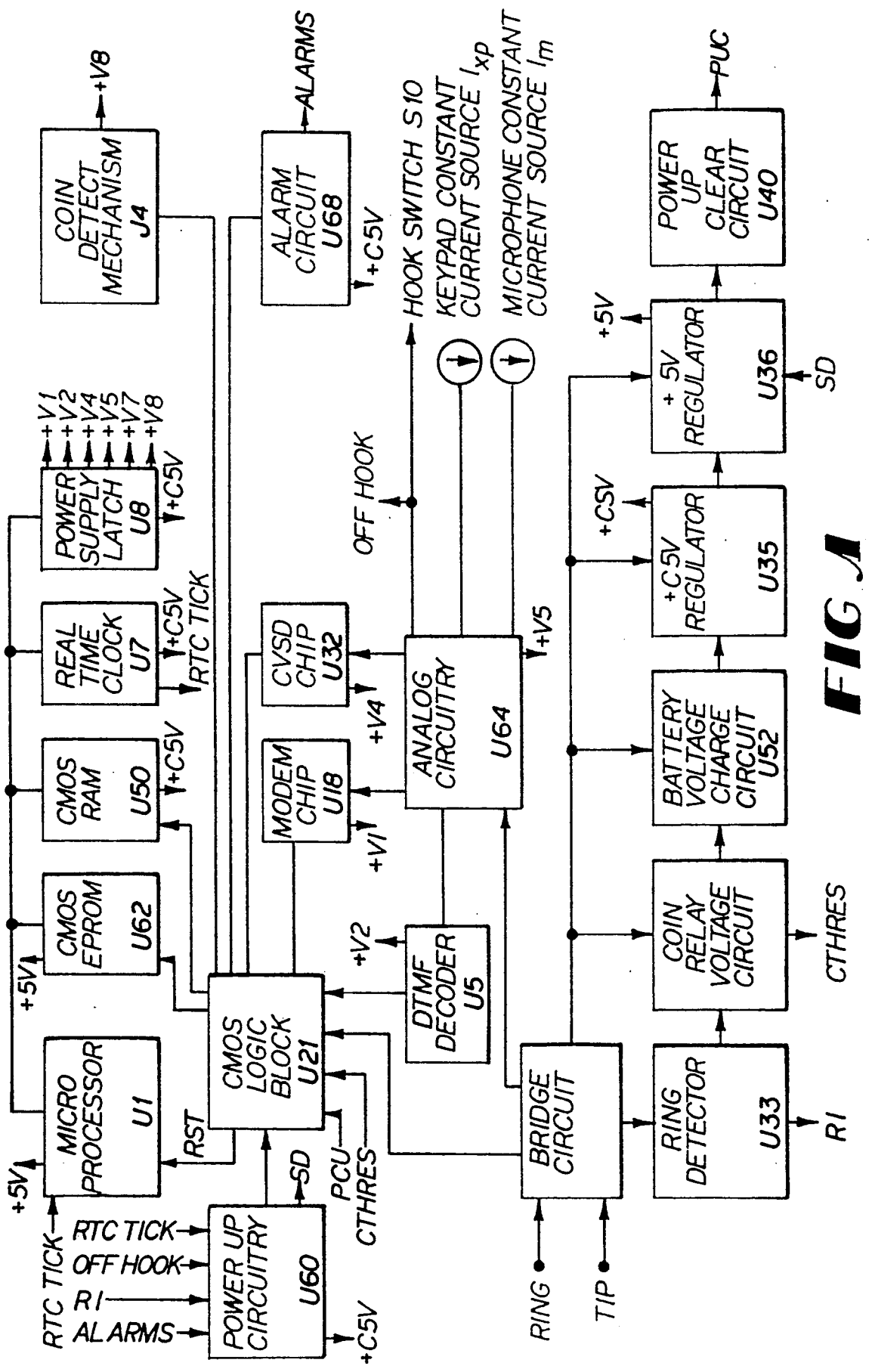
FIG. 1 is a functional block diagram of a preferred embodiment of the present invention.
Figure 2A:
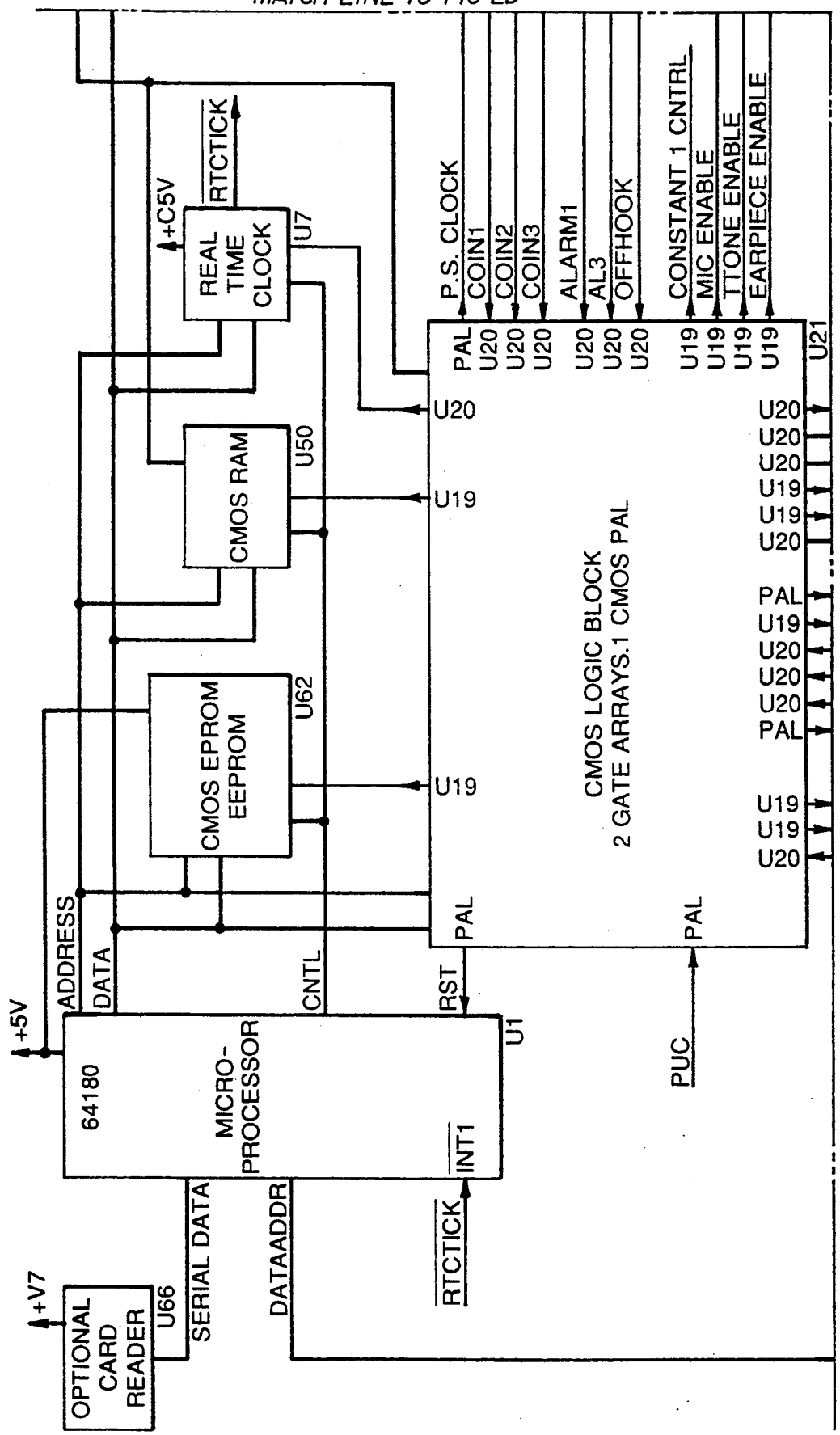
FIG. 2A-2F are more detailed circuit diagrams, showing the electronic components utilized in a preferred embodiment of the present invention.
Figure 2B:
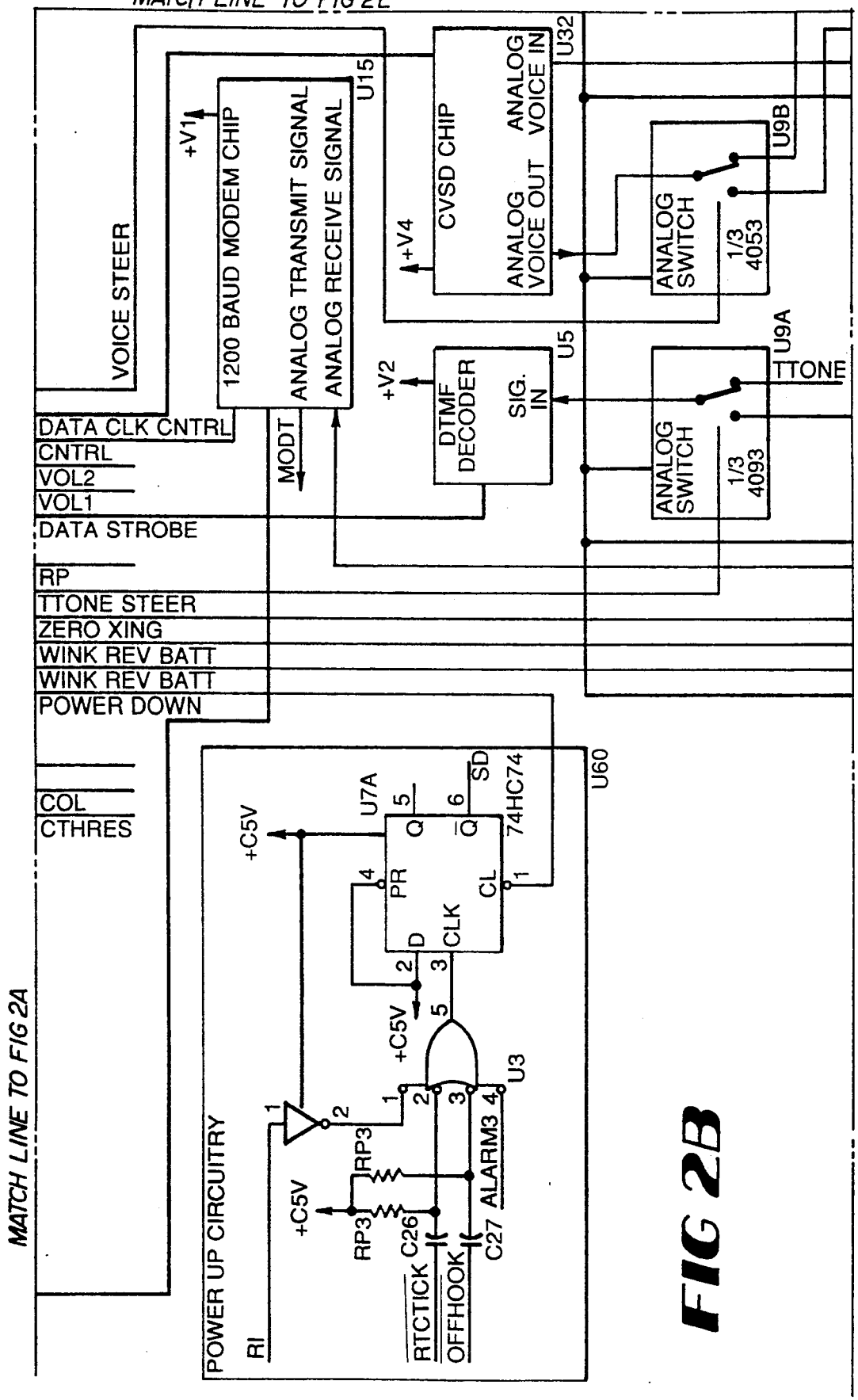
Figure 2C:
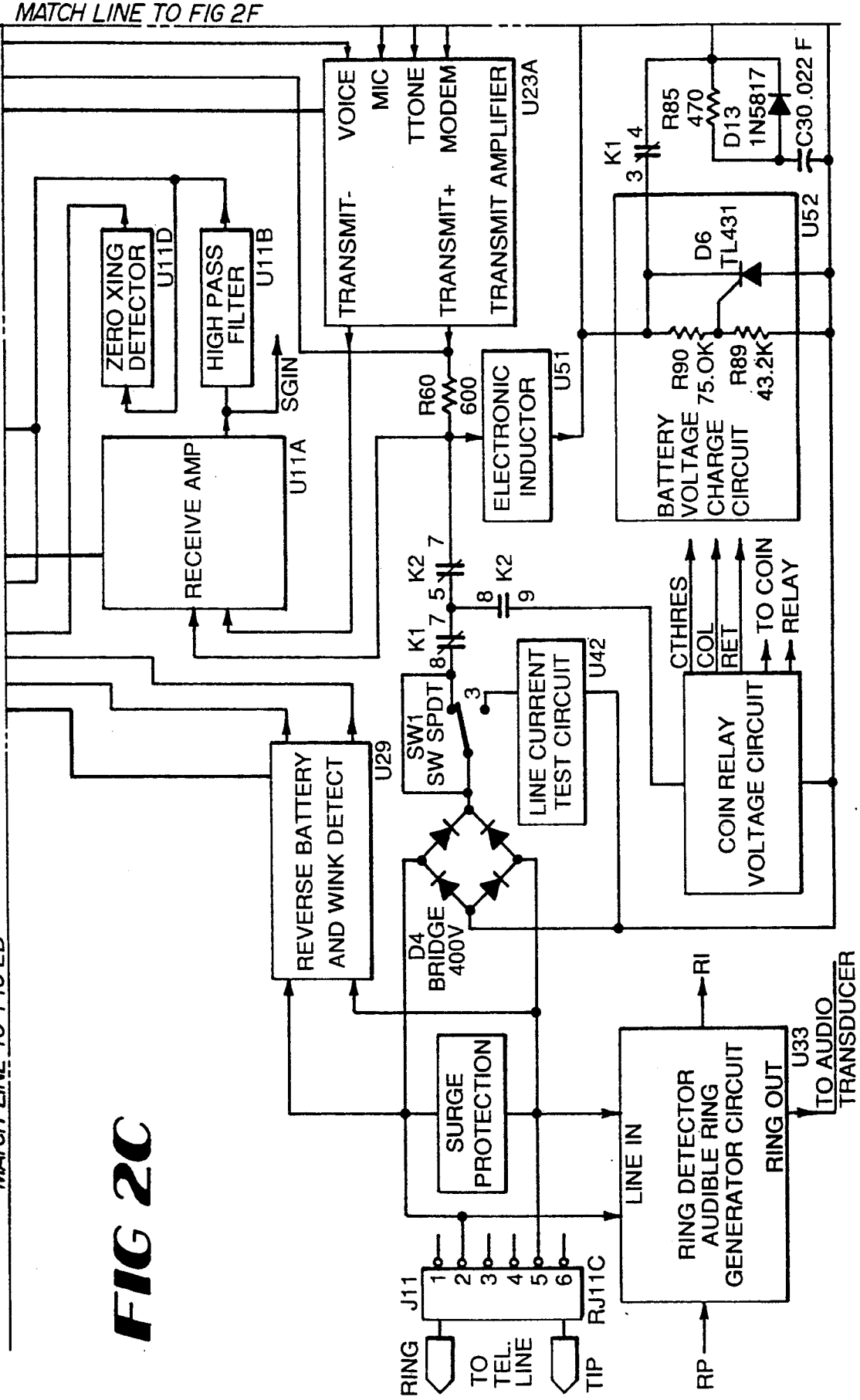
Figure 2D:
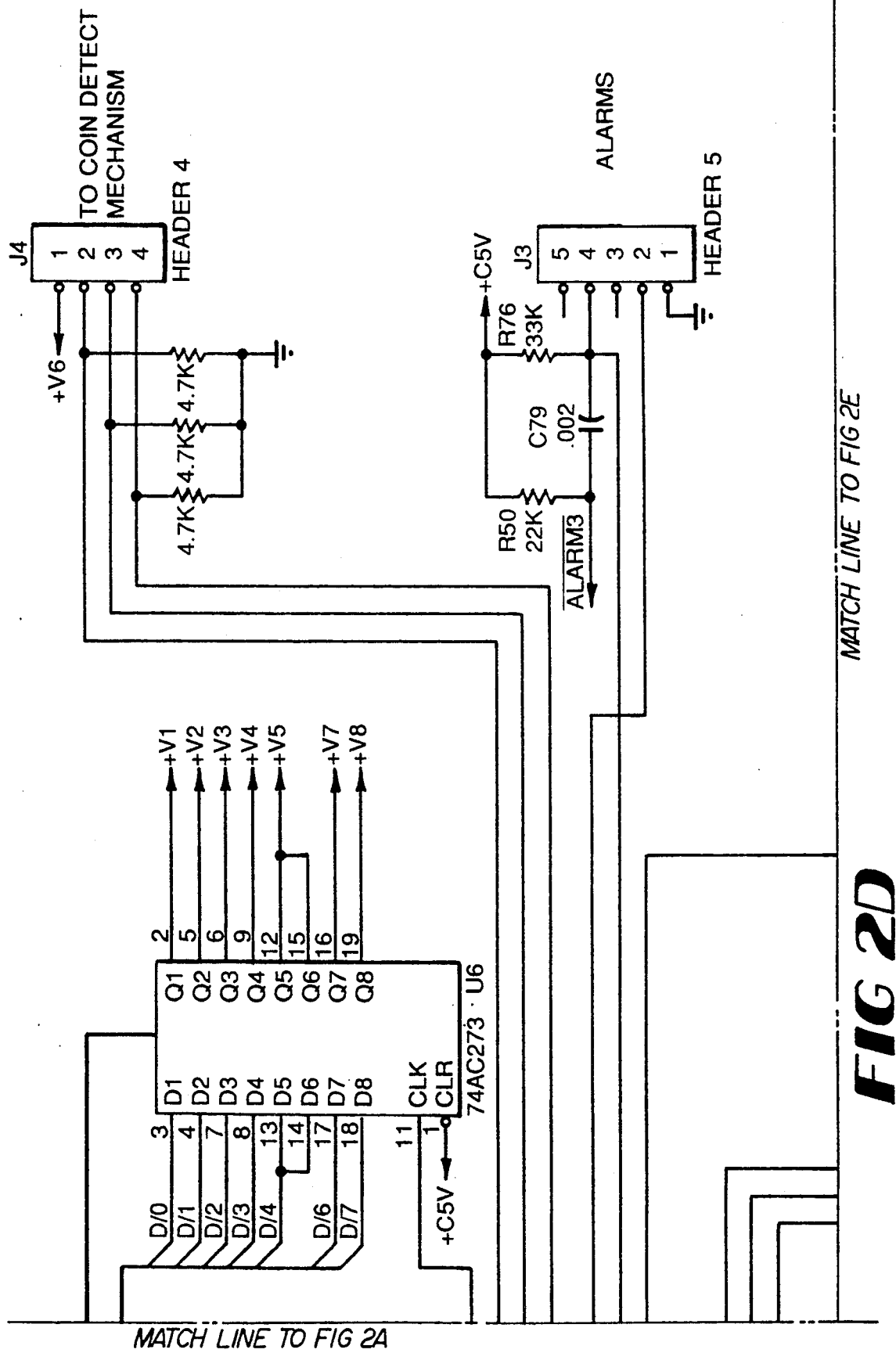
Figure 2E:
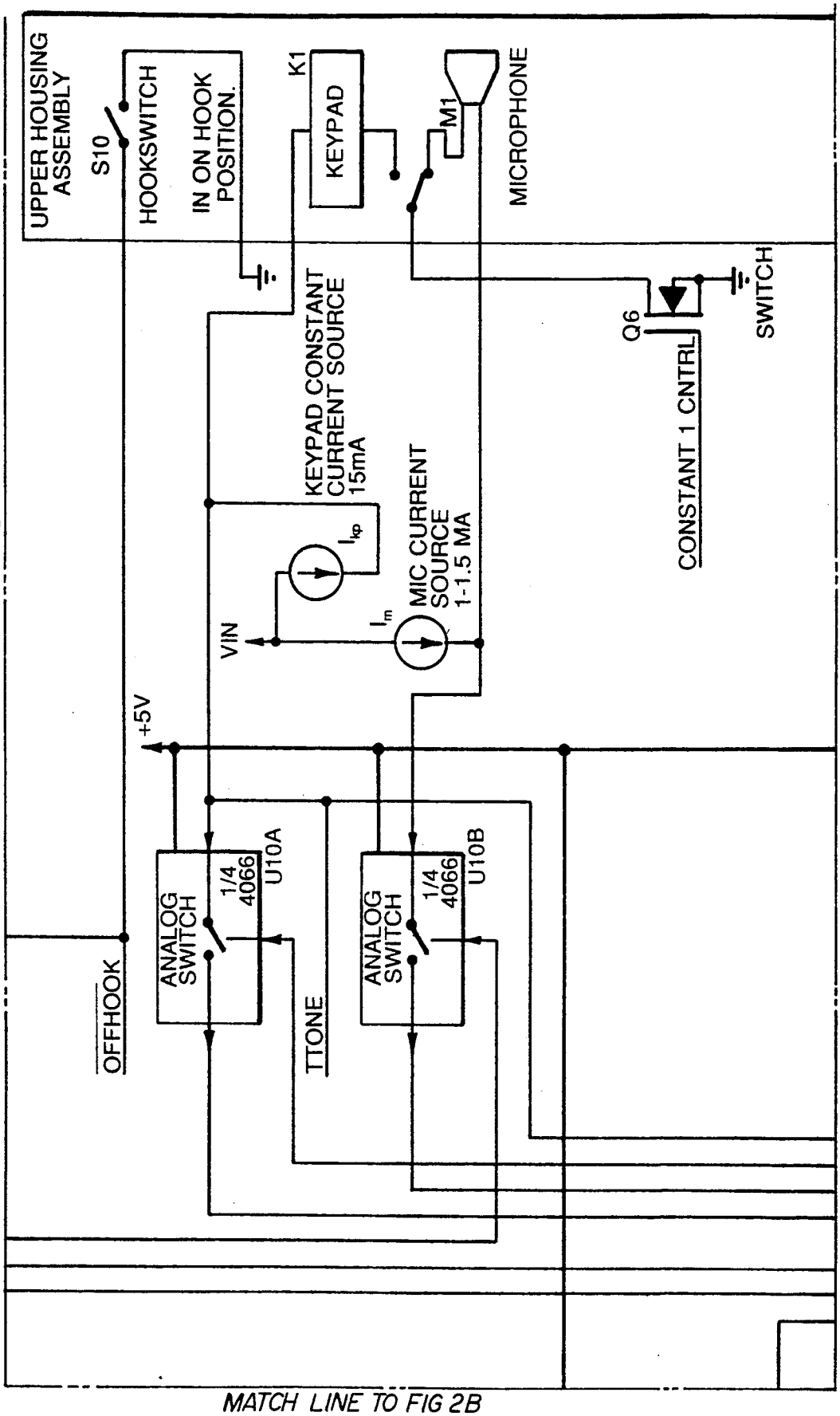
Figure 2F:
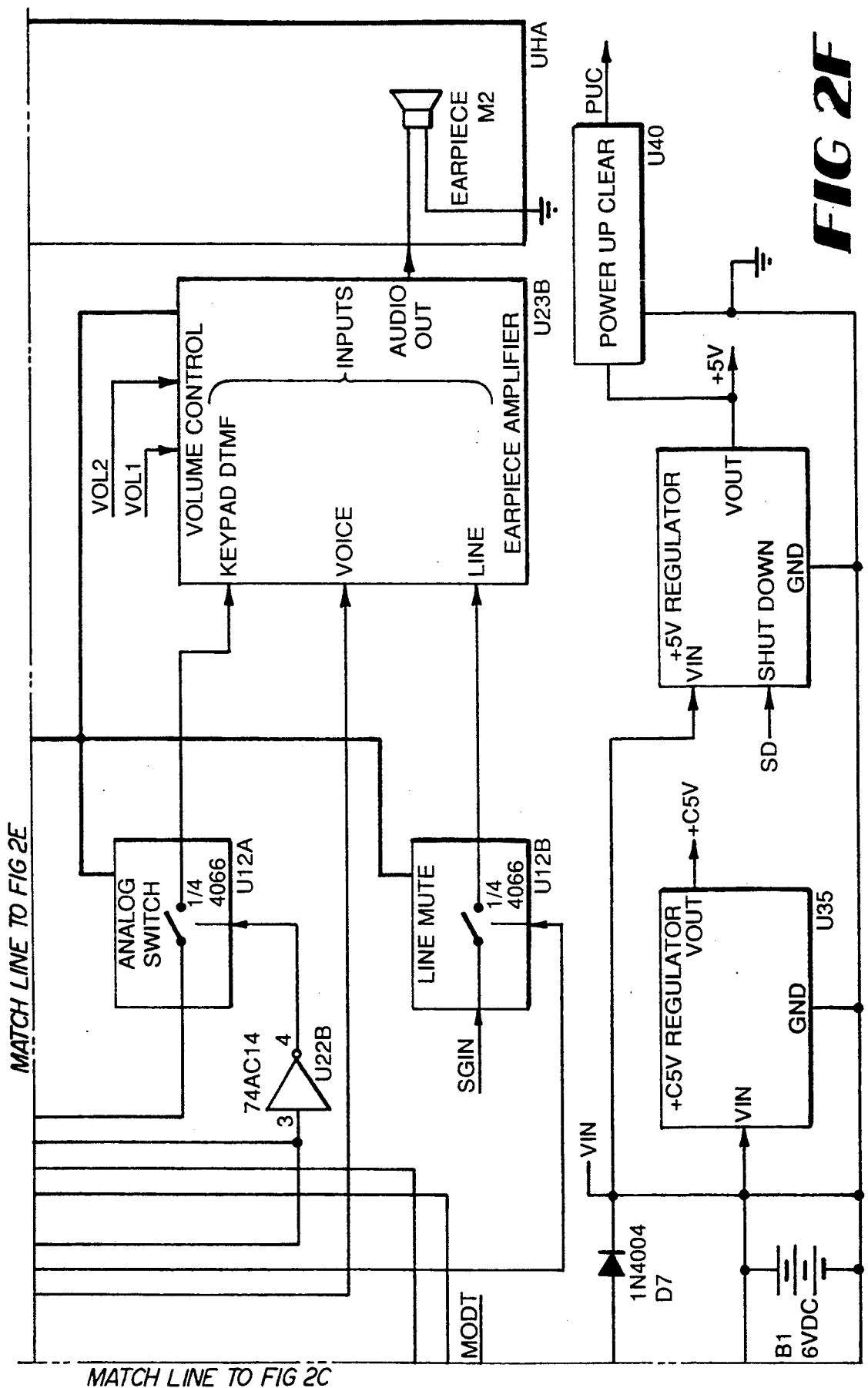

The preferred embodiment is now described with reference to the drawings. The present invention, as shown in FIGS. 1 and 2 is associated with a Central Office (CO) having tip and ring conductors, which are attached to the TIP lead and RING lead, respectively. The telephone of the present invention requires no connection to an external power source. All power for the telephone is derived from loop current flowing through the tip and ring conductors from the CO and through the telephone.

In the off-hook condition, the telephone is powered directly from the telephone line. Power usage is minimized in the off-hook condition by shutting down all non-essential circuitry when not being utilized. A rechargeable battery B1 is charged with the difference between the current from the telephone line and the current that the telephone is using. In the on-hook condition, the battery B1 provides the current necessary for operating the telephone.

The particular features of the circuitry of the present invention are now described with reference to the various operational conditions of the telephone.

1. On-Hook Condition

In the on-hook condition, i.e., when the telephone is in the idle state, the telephone is powered through the +C5 V regulator U35. The +5 V regulator U36 is turned off, which causes microprocessor U1 to be powered down to an "off-standby" state. In the "off-standby" state, the CMOS random access memory (RAM) U50, Real Time Clock U7, Power Up Circuitry U60, CMOS Logic Block U21, and Power Supply Latch U8 are the only devices powered. Since these devices are all CMOS, only a very low current, approximately 40 microamperes, is necessary to maintain the telephone during the on-hook condition.

The Real Time Clock U7 functions at all times. Once an hour a wake-up signal from the Real Time Clock U7 causes microprocessor U1 to be powered-up for approximately 1 millisecond to check all alarms. If all of the alarms are off, the microprocessor U1 powers down to resume its off-standby state. If any of the alarms are on, the microprocessor U1 is programmed to cause the telephone to "call home" to report the problem.

When a wake-up signal RTCTICK is received while the microprocessor U1 is in the off-standby state, the microprocessor U1 will power-up fully and proceed according to its program. The microprocessor U1 will also wake up if any of the following events occur: a closed condition is detected from the hookswitch S10, an incoming ring signal RI is received, or if the cash box is removed. For example, if the wake-up signal is the signal OFFHOOK caused by lifting the handset off of the hookswitch, the telephone will assume the off-hook condition as described later.

The +C5 V regulator U35 uses a maximum of approximately 40 microamperes of current to operate. This current is provided by the battery B1, since the available leakage current from the Central Office of about 5 microamperes is not sufficient to power the +C5 V regulator U35. The current drawn from the battery B1 to keep the essential memory and clock functions is typically about 12-20 microamperes. Power consumption increases on wake-up, when the microprocessor U1 powers-up for approximately 1 millisecond. For example, during the hourly wake-up by the Real Time Clock U7, power consumption increases to approximately 30 milliamperes.

Preferably the battery B1 is a lead acid battery having low current loss. As a result, the battery B1 will only discharge after a long period of non-use. In any given 24-hour period, the average current supplied by the battery B1 to operate the telephone is about 20 microamperes.

2. Off-Hook Condition

The telephone goes into a powered-up condition internally before possibly going off-hook to the Central Office (CO). An internal powered-up condition is generated in one of four ways:

1) a low transition on the wake-up signal RTCTICK generated by the Real Time Clock U7. This condition occurs every hour, as described with reference to the on-hook powered-down condition above;
2) a low transition on the hookswitch signal OFF-HOOK caused by the handset being removed from the hookswitch, thereby closing switch S10;
3) a positive transition of the incoming ring signal RI from the Ring Detector Circuit U33, which is caused by a ring-in signal on the tip and ring conductors; or
4) a low transition on an alarm signal, such as ALARM3, which is caused by the coin vault alarm.

In any of these cases the power-up circuitry U60 is enabled. If signal OFFHOOK is generated, this signal is coupled through capacitor C27, Resistor Pack RP3, and OR gate U3 to Clock CLK input (pin 3) of flip/flop device U7A. This input causes the output signal SD to go low, which consequently powers-up +5 V regulator U36. The power-up circuitry U60 is similarly enabled by the wake-up signal RTCTICK being coupled through capacitor C26, resistor pack RP3 and OR gate U3. Alarm Signal ALARM3 or incoming ring signal RI will also cause the output signal SD to go low and power-up the +5 V regulator U36.

As the +5 V regulator U36 comes up to the correct voltage, power-up clear signal PUC from the voltage detector of the power-up clear circuit U40 will transition from low to high. The power-up clear signal PUC is normally low and will go high when at least 4.5 VDC is detected by power up clear circuit U40. Preferably, the signal PUC is provided with positive feedback to prevent oscillations.

The signal PUC is connected to the CMOS Logic Block U21, which sends a reset signal RST to the microprocessor U1. The +5 V regulator U36 generates +5 V of power to the microprocessor U1. When reset signal RST goes high and the microprocessor U1 starts operating, the microprocessor U1 will check to see what caused the wake-up. If the wake-up is caused by an hourly wake-up from the signal RTCTICK, the microprocessor U1 operates as described above for the on-hook condition.

If signal OFFHOOK is received, the microprocessor U1 initiates the procedure for placing a call. Analog supply +V5, coin detect supply +V8, and DTMF Decoder supply +V2 are turned on by power supply latch U8. The keypad constant current source $I_{kp}$, which supplies approximately 15 milliamperes of current, is turned on. Analog switch U12A between the keypad K1 and the earpiece M2 is enabled so that the user can hear his own digits being dialed. Analog switch U9A, which is connected to DTMF decoder U5, is switched toward signal TTONE in order for the DTMF decoder U5 to detect the digits that the user dials. Then line mute analog switch U12B is enabled so that the user will be able to hear the dial tone through the earpiece. Off-hook relays K1(7-8) (meaning the switch between contacts 7 and 8 of relay K1) and K2(7-8) are closed to cause the telephone to go off-hook to the CO. The CO will detect the off-hook current and will send a dial tone to the telephone. The dial tone is connected from the TIP and RING, through diode bridge D4, relays K1(7-8) and K2(7-8), and receive amplifier U11A where signal SGIN is generated. Signal SGIN passes through the line mute analog switch U12B, into earpiece amplifier U23B, and then into earpiece M2, whereby the user will hear the dial tone from the CO. At this point, the user can dial digits and hear the digits that he dials. The microprocessor U1 will detect the digits and store them for processing. The user can also deposit coins in the coin box of the telephone, wherein the microprocessor U1 will detect the coins deposited and process that information.

The rechargeable battery B1, which provides power to the telephone in the on-hook condition, is charged sufficiently by the excess current available during the off-hook condition. Current will flow through bridge D4, switch SW1, and relays K1(7-8) and K2(7-8), to the electronic inductor U51. The electronic inductor U51 allows DC current to pass, while presenting a high impedance to AC signals. The DC current passes to the battery voltage charge circuit U52, which consists of a shunt regulator D6 and two resistors R89 and R90. The shunt regulator D6 functions to regulate the voltage at its cathode by shunting current when the voltage at its gate reaches approximately 2.495 volts. The two resistors R89 and R90 are chosen so that the regulated voltage at the cathode is approximately 6.827 VDC and the voltage drop across the rechargeable battery B1 is approximately 7.55 VDC. Loop current will flow through relay K1(3-4) and into battery B1 if its voltage is less than approximately 6.85 VDC. Capacitor C30, resistor R85 and diode D13 are used to provide short-term CMOS memory backup if the battery B1 should require changing. Capacitor C30 is preferably a 0.022 farad super-capacitor, which is kept charged through resistor R85 and discharges through diode D13. Diode D7 prevents current from flowing back into the battery voltage charge circuit when the telephone is on-hook. In the off-hook condition, current flows through diode D7 if the voltage on the battery B1 is less than the voltage across the battery voltage charge circuit.

While the telephone is in the off-hook condition, the battery B1 is charged with the difference between the line current from the Central Office telephone line and the current that the phone is using. If the battery B1 is fully charged to 6.85 VDC, then the current which flows through the shunt regulator D6 of the battery voltage charge circuit U52 will equal the difference between the line current and the current the telephone is using. Battery B1 will then be utilized when the phone is in the on-hook condition.

The +5 V regulator U36, like the +C5 V regulator U35, preferably requires only microamperes of quiescent current to function. The +5 V regulator U36 is powered-down in the on-hook condition. When the power-up circuitry U60 receives a wake-up signal, +5 V regulator U36 provides a regulated voltage of +5 V to the microprocessor U1 and the CMOS EPROM U62, which contains programs for controlling the operations and decoding logic of the microprocessor U1.

As described above, the power-up circuitry U60 initiates a power-up of the microprocessor U1 when the telephone goes off-hook. To power-up the microprocessor U1, gate U3 must provide a positive edge to the clock CLK at pin 3 of Flip/Flop U7A. This causes the signal SD to go low, thereby maintaining the +5 V regulator U36 in the powered-up state. To power-down, the microprocessor U1 signals the CMOS Logic Block U21. This causes Pin 1 of flip-flop U7A momentarily to go low, causing the signal SD to go high. When signal SD goes high, the +5 V regulator U36 shuts down.

The CMOS logic block U21 may include two CMOS gate arrays and a PAL chip which are used for some of the processing functions of the telephone. The first gate array provides decoded memory addresses for program, voice, rates and system RAM memories. The first gate array also provides a watchdog function and latches. The watchdog function is used to reset the microprocessor U1 should the microprocessor U1 not address the watchdog within a period of 8 seconds. If the microprocessor U1 is not addressed, the watchdog will bring the reset line to the microprocessor U1 low for 8 seconds and then high.

CMOS logic block U21 further includes a second gate array to provide decoded chip I/O selects for the modem chip U18 and DTMF decoder U5, and the Real Time Clock U7. The gate array includes input buffers for alarms, wink and reverse battery detection, coin-in detection, DTMF strobe, and coin voltage detection.

For power conservation, various elements, such as modem chip U18, DTMF decoder U5, continuously variable slope delta modulator/demodulator (CVSD) chip U32, analog circuitry U64 and card reader U66 have their own independent power supplies. These power supplies are controlled by power supply latch U8, which is preferably a CMOS PAL latch. The microprocessor U1 controls the power to each function by writing out to latch U8. If it is desired to turn on a function, then the bit on the data bus associated with that function must be set when writing to the power supply latch U8.

Preferably, power supply latch U8 controls at least six power supplies. Modem supply +V1 is used to power the modem chip U18. Modem chip U18 is powered-up when dialing DTMF digits or when establishing full duplex PSK modem communication at approximately 1200 baud. A DTMF supply +V2 is used to provide power to the DTMF decoder U5, which uses approximately 3.8 microamperes of current. The CVSD chip U32 is powered by CVSD supply +V4. The CVSD chip U32, which is used to play prerecorded digitized voice, uses approximately 6 microamperes of current. Analog supply +V5 is used to power the majority of the analog circuitry U64, which includes the transmit and earpiece amplifiers U23A and U23B, the receive amplifier U11A, and the analog switches U9, U10 and U12. A card reader supply +V7 may be used to power optional credit card reader U66. The coin switches of the coin detect mechanism J4 are powered by a coin detect supply +V8. When a coin is deposited, approximately 1 milliampere of current flows through the coin switches for about 10-50 milliseconds.

Coin-in detection and coin jam detection are performed by the CMOS Logic block U21. To detect coins, the microprocessor U1 must first turn on the coin detect supply +V8. The coin signal COIN1, COIN2, or COIN3 corresponding to the coin deposited goes high, causing a latch to be set inside CMOS logic block U21. The 3 coin signals COIN1, COIN2, and COIN3 are ORed together for detecting coin jams. Should a coin jam occur, the microprocessor U1 will turn off coin detect supply +V8 after approximately 1 second so that current flow will not discharge the battery B1. The microprocessor U1 will call home and report the coin jam, and only coin-free calls will be allowed to proceed.

While the telephone is in the off-hook condition, the microprocessor U1 is put into a low power mode to conserve power. The microprocessor U1, which is usually in a low power mode, receives an interrupt every 1/64 of a second to wake-up into a full power mode to do the necessary system processing for that time. When the microprocessor U1 has completed its processing, it puts itself into the low power mode until the next wake-up. In the full-power mode, the microprocessor U1 consumes approximately 30 milliamperes of current. In the low power mode, the microprocessor consumes only about 4 milliamperes of current. This allows the average power consumption of the microprocessor U1 during the telephone's off-hook condition to be approximately 11 milliamperes.

The telephone instrument interface includes an upper housing assembly UHA. The components of the housing assembly UHA comprise the hookswitch S10, microphone M1, keypad K1, and earpiece M2. MOSFET Q6 controls constant current sources $I_m$, $I_{kp}$ for the microphone M1 and the keypad K1. The circuit is biased so that approximately 1.5 milliamperes of current will be provided to the microphone M1 when the battery B1 is at 6.5 VDC. The DTMF keypad K1 will receive approximately 15 milliamperes of current. When the telephone is on-hook, current does not flow through the hookswitch S10.

On ring-in, the ring detect circuit U33 will detect a ring signal, whereby incoming ring signal RI goes high. This signal will activate the power-up circuitry U60, thereby powering-up the +5 V regulator U36. When the ringing signal on the tip and ring conductors is greater than 40 Vrms, an audible ring tone will be emitted. Preferably, the ring detect circuit U33 will provide ring rejection of rotary dial transients, lightning, and induced high voltage transients.

The voltage and resistance from the CO are approximately 48 VDC and 400 ohms, respectively. To operate the telephone in the off-hook condition, the tip and ring conductors must be capable of supplying 20.3 milliamperes of current at 9.4 volts. If the resistance from the telephone line is greater than 1500 ohms, then a DC power supply should be used to power the telephone. The line current test circuit U42 indicates that sufficient current is being supplied to operate the telephone.

3. Coin Collections and Refunds

Figure 3:
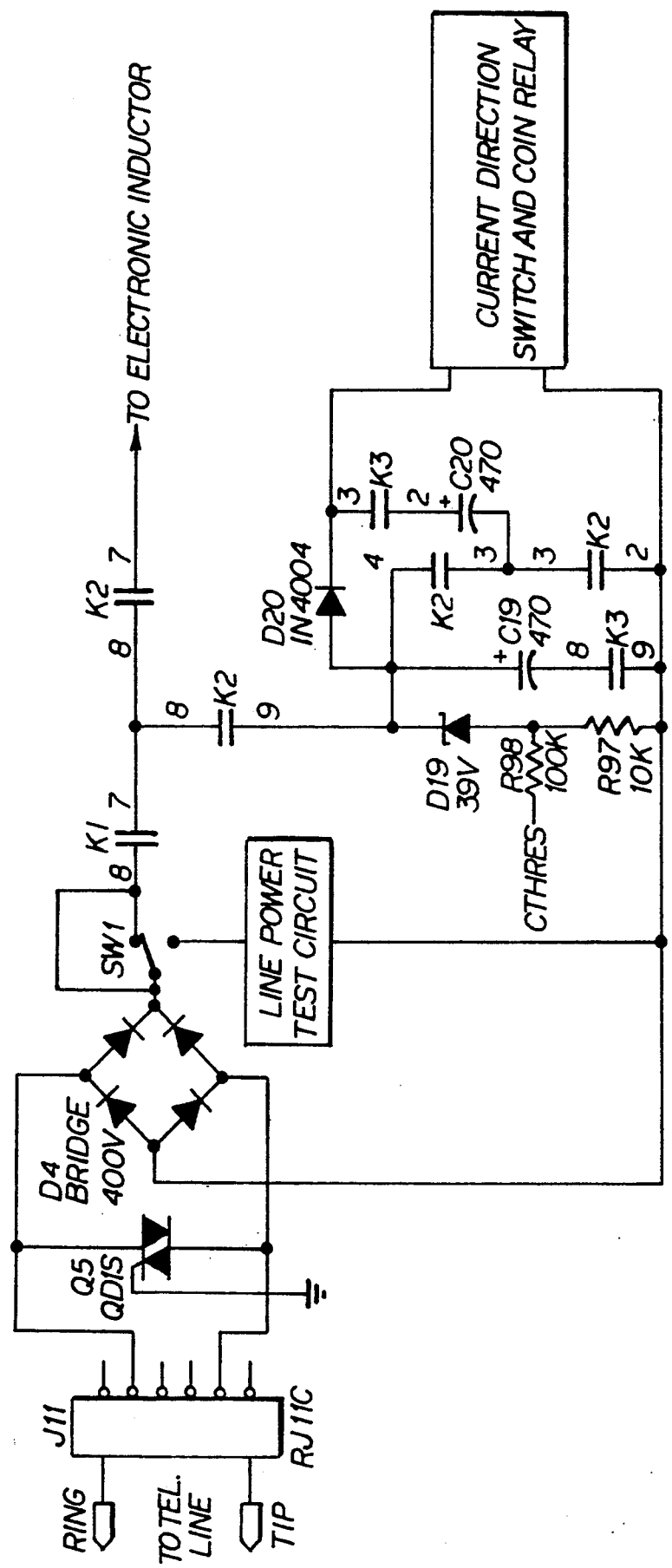
FIG. 3 is a detailed circuit diagram showing the coin relay voltage circuit of the present invention.

As shown in FIG. 3, the telephone stores charge in two capacitors C19, C20 for operating the coin relay. Power from the Central Office (CO) is used to charge the two capacitors C19 and C20 in the off-hook condition. The coin relay is fired (i.e., energized) either (a) to cause a mechanical action to collect or to return coins in escrow at the end of a call, or (b) to collect the money during long calls in which the escrow is filled up with coins.

Capacitors C19 and C20 are placed in parallel for charging, and, when charged, are then placed in series in order to provide the voltage and charge necessary to operate the coin relay. Zener diode D19 and resistors R97 and R98 provide a means for measuring the voltage across capacitors C19 and C20, when they are placed in parallel across the TIP and RING. When the voltage across capacitors C19 and C20 is 42 V, the signal CTHRES is at a voltage high enough to indicate to the microprocessor U1 that the capacitors C19 and C20 are charged.

Relays K1, K2, and K3 are operated under control of the microprocessor U1 so that the capacitors C19 and C20 may be placed in parallel or in series. To place capacitors C19 and C20 in parallel across the telephone line, relays K1(8-7), K2(8-9) and 2-3), and K3(2-3 and 8-9) are closed. Capacitor C19 is directly connected across the TIP and RING through bridge D4, and capacitor C20 is connected across the TIP and RING through bridge D4 and diode D20. Once the capacitors C19 and C20 are fully charged, relay K2(8-9 and 2-3) is opened, and relay K2(3-4) is closed to connect capacitors C19 and C20 in series. If the charge on capacitors C19 and C20 is not to be immediately used to operate the coin escrow relay, then relay K3(2-3 and 8-9) is opened to prevent the charge on capacitors C19 and C20 from leaking through diodes D19 and D20. Preferably, the telephone uses DPDT latching relays which only take approximately 80 milliwatts to operate. The coils of the coin escrow relay are driven by advanced CMOS logic which can provide the required current to energize the coin relay.

In the off-hook condition, capacitors C19 and C20 are kept charged as much as possible. Every time a coin is deposited in the telephone, capacitors C19 and C20 (in parallel) are charged by being placed across the 42+ volt off-hook line power for about 120 milliseconds. This process also generates an audible click to let the user know the coin was received. About twelve coins deposited will fully peak the charge. This enables the coin relay to be fired to collect coins when the coin escrow is full. When this condition is sensed, the microprocessor U1 switches the capacitors C19 and C20 to be in series, thereby providing a potential of 84+ volts to be used to fire the coin escrow relay. As more coins are deposited, the capacitors C19 and C20 will continue to charge. Thus, the coin collect and return function is essentially self-powered. The coins deposited will build the necessary charge for firing the relay, and the coin relay can be fired as needed when the escrow is full or a call is completed. The number of coins required to peak the charge is much less than the number of coins which can be held in escrow.

The charge is used when the coin relay is fired. At the end of a call, the system determines if the capacitors C19 and C20 are sufficiently charged, charges the capacitors, if necessary, and fires the coin relay to collect or refund coins, as appropriate, thereby discharging capacitors C19 and C20. The capacitors C19 and C20 are then precharged for the next call. Charging the capacitors C19 and C20, prior to going on-hook, takes approximately 2 seconds. After the capacitors C19 and C20 are charged, either a new call may be started or an on-hook condition is indicated to the CO and the microprocessor U1 is powered down. An on-hook condition is indicated by opening relays K1(7-8) and K2(7-8) so that current is no longer drawn from the line.

4. Line Drive/Receive Circuit

The line transmit amplifier U23A (FIG. 2) is used to set signal levels. The signals transmitted to the CO are from modem chip U18, the keypad K1, and the CVSD chip U32. The modem chip U18 preferably provides a 1200 baud full duplex modem function as well as DTMF generator capabilities.

The microphone signal MIC is coupled to the transmit amplifier U23A through an analog switch U10B. Because the current through the microphone M1 is on for the duration of a call, it is desirable to reduce the current as much as possible without degrading the S/N ratio. Thus, the current through the microphone M1 is set at approximately 1.5-2 milliamperes. Analog switch U10B is used to switch the signal MIC, and consequently microphone M1, on and off.

The keypad K1 is coupled to the transmit amplifier U23A through analog switch U10A. Analog switch U10A is used to monitor digits dialed to the CO.

CVSD chip U32 is coupled to the transmit amplifier U23A through analog switch U9B. Analog switch U9B allows the recorded analog data to be steered to either the transmit amplifier U23A or to the earpiece amplifier U23B. CVSD chip U32 is turned on only when a playback or record function is desired so as to minimize power consumption. The telephone needs about 30 milliamperes to operate during voice playback. If the line current cannot supply the necessary current, then the battery B1 will supply the remaining current.

The telephone also has the ability to identify conventional audio signals, such as ringback, SIT tone, voice, and busy back. A signal from the CO line is coupled to receive amplifier U11A. The output of U11A goes through a third order high pass filter U11B, which has a 180 Hertz cut-off frequency. The purpose of filter U11B is to reduce 60 Hertz power line distortion to the zero-crossing detector U11D. The zero-crossing detector U11D is used as an answer supervisor. Detector U11D has some hysterisis so that it does not trigger on noise from digital circuits. The zero crossings are fed to the CMOS logic block U21, which has an 8-bit counter to count the zero crossings.

The signal SGIN from the high pass filter U11B is also sent to the earpiece M2 through line mute switch U12B. In addition, the signal SGIN from filter U11B goes to DTMF decoder U5. The signal SGIN to the DTMF decoder U5 can come from the CO line, the microphone M1, or the keypad K1.

5. Alarms

The telephone shown in the preferred embodiment supports 13 alarms, which are used in the on-hook condition. For instance, signal ALARM3 is the vault alarm signal. If the coin vault of the pay telephone has been tampered with, pin 4 of alarm circuit U68 will go low, causing a low pulse on the opposite side of capacitor C79. As described above, a low pulse on signal ALARM3 will cause the power-up circuitry U60 to power-up the +5 V regulator U36, which causes the microprocessor U1 to power-up. The signal ALARM3 is fed into the CMOS logic block U21, which signals the microprocessor U1 to call home and report the alarm. The microprocessor U1 can read the status of ALARM3 through a gate array of the CMOS Logic Block U21. Other alarms, such as are generally desirable in pay telephones, may be similarly provided for.

6. Wink and Reverse Battery Detection

The telephone has the ability to detect wink and reverse battery conditions on the telephone line. The reverse battery and wink detect circuit U29 (FIG. 2) includes a high impedance differential amplifier, which is connected directly across the telephone line, and capacitors which decode the wink and line polarity states. Wink detection will allow the microprocessor U1 to monitor the current and to enter an anti-fraud mode if a wink is detected. In the anti-fraud mode, the keypad K1 is disabled. A reverse battery detection function may also be implemented.

7. Call Scenario

Figure 4:
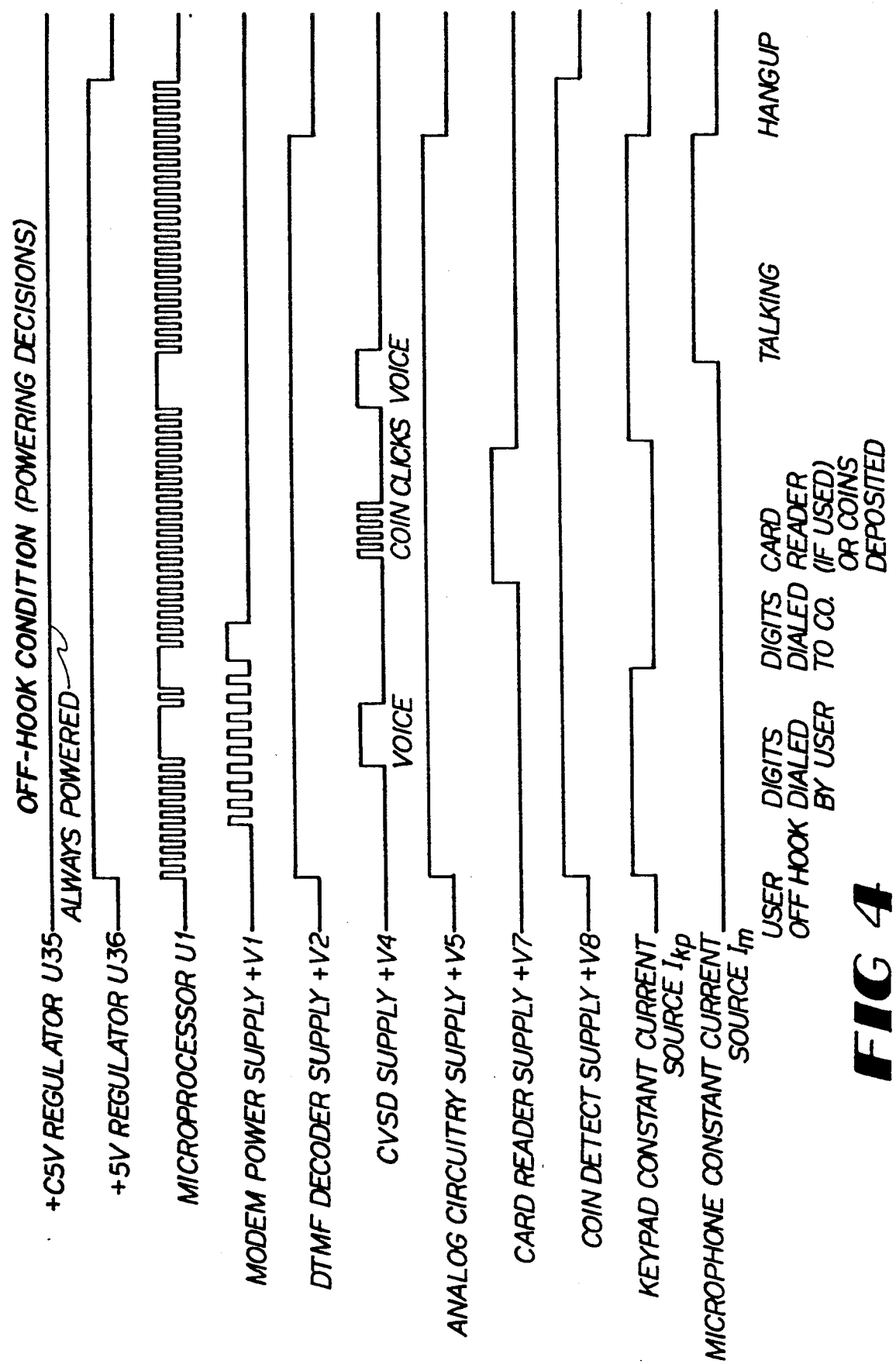
FIG. 4 is a timing diagram showing the powering decisions of the present invention in the off-hook condition.

Some of the powering decisions which occur during a call are shown in FIG. 4. To initiate a call, a user will pick up the handset of the telephone, which will create an off-hook condition and power up the microprocessor U1 as described above. The user will either dial the desired telephone number or deposit coins into the telephone. When the user enters the first digit on the keypad K1, analog switch U10A (FIG. 2) closes and signal SGIN is generated through the transmit amplifier U23A and the receive amplifier U11A. Line mute analog gate U12B closes and the dial tone that the user hears is turned off, giving the user the impression of "breaking the dial tone." Signal TTONE through analog switch U12A will still enable the user to hear any subsequently dialed digits. When the second digit is entered by the user, the microprocessor U1 will determine if the call is local or long distance. The microprocessor U1 will begin "trickle dialing" the digits out on the telephone line. With trickle dialing, the microprocessor U1 will dial (i.e. send out a DTMF tone) one digit at a time to the CO at 3 second intervals. The duration of a tone for each digit to the CO takes approximately 75 milliseconds. The 3 second interval keeps the telephone line off-hook to the CO while the user is entering numbers on the keypad K1 or depositing coins. Trickle dialing is also used for power conservation since the modem chip U18 only needs to be powered-up for approximately 75 milliseconds with each digit dialed out on the telephone line. Trickle dialing will continue until the user deposits all the necessary money and all of the digits have been entered by the user. All the digits may be entered by the user before any money is deposited and the digits will be stored in memory. The microprocessor U1 will trickle dial out all the digits the user dials less one digit to prevent the call from being completed.

The purpose of trickle dialing is to conserve power and to charge the rechargeable battery B1 with the excess power from the telephone. While trickle dialing, the modem power supply +V1 for the modem chip U18 is turned on for 150 millisecond intervals. The microprocessor U1 waits for 75 milliseconds for the internal oscillator to come up to frequency on the modem chip U18. Then the microprocessor U1 signals the modem chip U18 with a signal CNTRL from CMOS Logic Block U21 to dial a DTMF digit to the CO. The digit tone is held for 75 milliseconds and then modem supply +V1 is turned off. During trickle dialing, the modem chip U18 is powered up for approximately 150 milliseconds and is powered down for approximately 3 seconds. Once the proper coinage is deposited, all digits are dialed out in 75 millisecond intervals. such that supply +V1 remains on during the dialing out.

Before all the digits are dialed to the CO and after the user has entered all the digits, the microprocessor U1 will price the call. The CVSD chip U32 is turned on by CVSD supply +V4 to allow the CVSD chip U32 to speak to the user. The voice control analog switch U9B is steered toward the earpiece amplifier U23B so the user can hear the speech. The microprocessor U1 will control the message sent to the user to request the amount of money necessary to complete the call. When the voice message is finished, CVSD supply +V4 is turned off.

During the final call processing, the keypad constant current source $I_{kp}$ is turned off to disable the keypad K1. The final digits of the call are dialed out. The microprocessor U1 monitors the telephone line for remote party answer. This answer supervision function is performed by the zero crossing detector U11D, through CMOS Logic block U21 to the microprocessor U1. When an answer is detected, the microphone constant current source $I_m$ is turned on. Analog switch U10B is enabled by signal MIC ENABLE CMOS from Logic Block U21. This, in turn, generates signal SGIN to enable the line mute analog switch U12B. This allows the user to talk from the microphone M1, through the microphone analog switch U10B, the transmit amplifier U23A, resistor R60, relay K2(7-8), relay K1(7-8), switch SW1, diode bridge D4 to the CO. The receive path is also open as described above.

During a call, when more money needs to be deposited, the CVSD chip U32 will power up and tell the user how much to deposit. The capacitors C19 and C20 will fire the coin relay if escrow is full. Inserting more coins will peak the charge on the capacitors C19 and C20.

When the user is finished with the call and hangs up the receiver on the hook-switch, the microprocessor U1 fires relay K1 to make the telephone go on-hook to the CO. Analog supply +V5, DTMF supply +V2, the keypad constant current source $I_{kp}$, and the microphone constant current source $I_m$ are all turned off. Other power supplies which were selectively turned on and off during call processing remain off. The coin detect supply +V8 is left on to detect coins while the telephone is in the on-hook condition. Thus, all the voltage and the constant current sources $I_{kp}$, $I_m$ are off except for coin detect supply +V8. The microprocessor U1 waits approximately 3.5 seconds for the telephone line to settle and then generates a signal POWER DOWN. Just prior to this, the coin relay is fired and recharged as described above. Signal POWER DOWN triggers the latch clear pin CL of flip/flop U7A of the power-up circuitry U60. Flip/flop U7A is cleared and signal SD will go high. This causes the +5 V regulator U36 to shut down. As the current drops, the power-up clear circuit U40 will cause the power-up clear signal PUC to go low. The low signal PUC will reset the microprocessor U1 through the PAL chip of the CMOS logic block U21. After shutting down, the power consumption by the telephone drops from approximately 30 milliamperes to approximately 40 microamperes.

On hangup, the telephone will remain off-hook to the CO for 3.5 seconds. During this time, capacitors C19 and C20 will fully charge and fire the coin relay. Before the microprocessor U1 is powered down, capacitors C19 and C20 are pre-charged for the next call.

One set of values or types of components in FIGS. 1 and 2 which embody the invention is listed below:

| Device | Part No. | Representative Manufacturer |
|---|---|---|
| D7 | IN4004 | |
| D6 | TL431 | Texas Instruments |
| U1 | HD64180 | Hitachi |
| U5 | MT8870 | Mitel |
| U7 | 72421 | Epson |
| U7A | 74HC74 | Texas Instruments |
| U8 | TICPAL22V10Z | Texas Instruments |
| U9 | MC14093 | Motorola |
| U10 | MC14066 | Motorola |
| U11 | MC33174 | Motorola |
| U18 | SSI73K212L | Silicon Systems |
| U21 | S38AC033PP01 (gate array) | Motorola |
| | S38BC013PP03 (gate array) | Motorola |
| | TICPAL22V10Z (PAL chip) | Texas Instruments |
| U23 | MC143404 | Motorola |
| U29 | MC33174 | Motorola |
| U32 | MC3418 | Motorola |
| U35 | MAX666 | Maxim Semiconductor |
| U36 | MAX666 | Maxim Semiconductor |

While the above description contains many specificities, these should not be construed as limitations on the scope of the invention but rather as an application of preferred embodiments thereof.

What is claimed is:

1. A pay telephone for use in a telephone system with a central office having tip and ring conductors for connecting to said telephone and in which loop current flows from said central office and through said telephone responsive to an off-hook condition at said telephone being sensed by said central office, comprising:

a hookswitch for sensing when said telephone is in use;

a means for controlling the operation of functions of said telephone, including sensing when said hookswitch is in the open or closed position, and for controlling whether said telephone is in the off-hook or on-hook condition to the central office;

a rechargeable battery for providing power to operate said telephone, including said controlling means, when said telephone is in the on-hook condition;

means for maintaining said battery in a charged condition when said telephone is in the off-hook condition utilizing loop current in excess of the amount needed to operate said telephone;

wherein said controlling means minimizes power consumption when said telephone is in the off-hook condition by shutting down operation of functions of said telephone when such functions are unnecessary.

2. A line-powered pay telephone as recited in claim 1, wherein the means for minimizing power consumption comprises means for selectively powering different functions of the telephone.

3. A line-powered pay telephone for use in a telephone system with a central office having tip and ring conductors for connecting to said telephone and in which loop current flows from said central office through said telephone when said telephone is in the off-hook condition to the central office, comprising:

a coin relay for collecting and returning coins deposited in the pay telephone, wherein said coin relay requires for collection or return of coins a voltage potential higher than the off-hook voltage potential across the central office tip and ring conductors; and a plurality of capacitors for storing the necessary charge and providing the necessary voltage for firing said coin relay to collect or return coins at the end of a call and to collect coins during a call without causing loss of loop current flow, wherein said capacitors are placed in parallel across the tip and ring conductors for charging and in series for firing said coin relay.

4. A line-powered pay telephone as recited in claim 3, which further comprises relay means for selectively placing said plurality of capacitors in parallel or in series.

5. A line-powered telephone as recited in claim 3, wherein said at least one capacitor is kept charged as fully as possible in the off-hook condition.

6. A line-powered pay telephone as recited in claim 3, wherein said plurality of capacitors are kept charged as fully as possible in the off-hook condition.

7. A line-powered pay telephone as recited in claim 3, wherein said plurality of capacitors are placed in parallel across the tip and ring conductors for at least partial charging each time a coin is deposited in said telephone.

* * * * *